Figure 1:
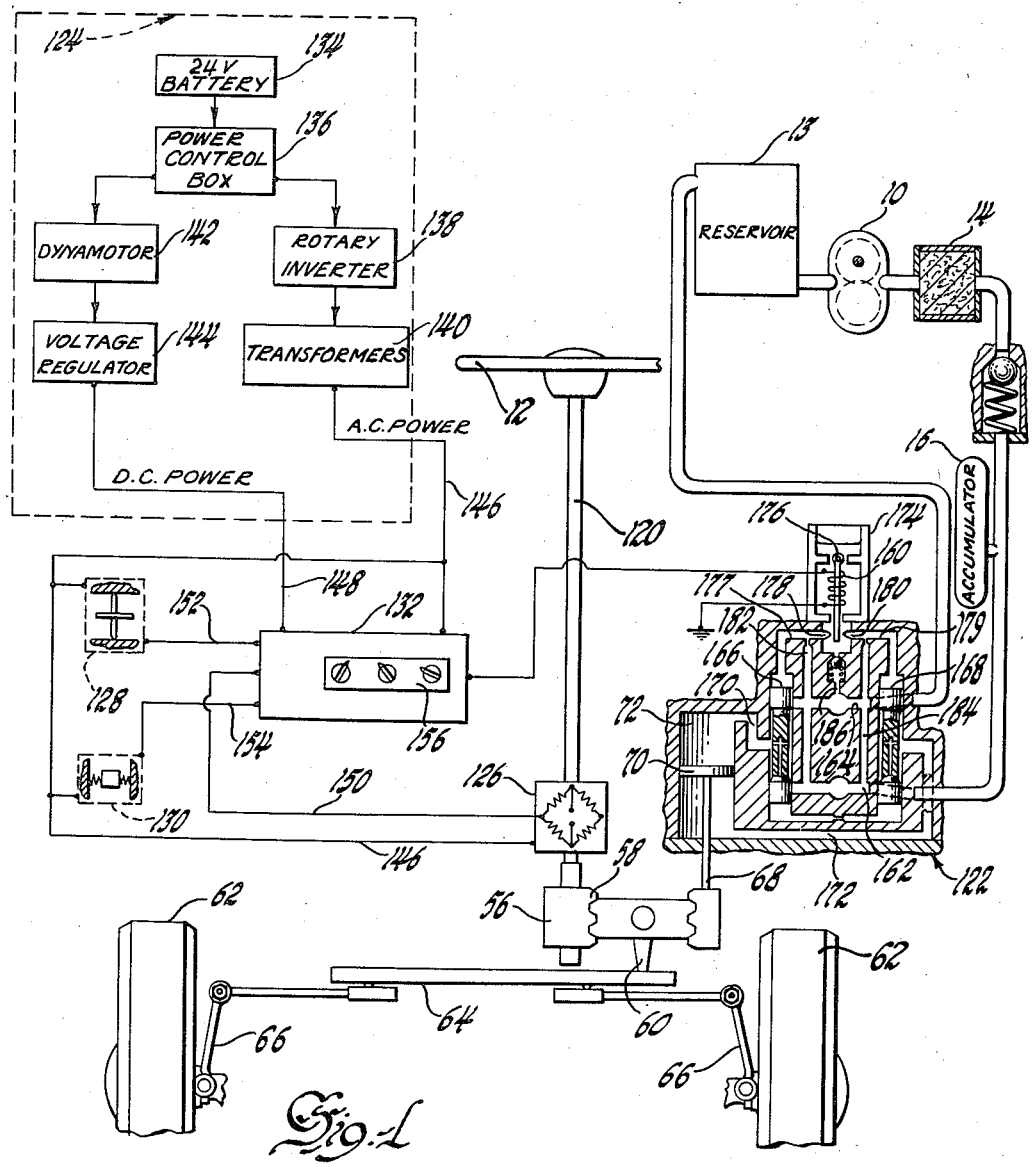

Dec. 23, 1958 W. F. MILLIKEN ET AL 2,865,462
AUTOMOTIVE VEHICLE HAVING FREE CONTROL
AND STABILITY FEATURES
Filed March 1, 1956

INVENTORS
William F. Milliken &
BY David W. Whitcomb
J. C. Thorpe
ATTORNEY

2,865,462

AUTOMOTIVE VEHICLE HAVING FREE CONTROL AND STABILITY FEATURES

William F. Milliken, Williamsville, and David W. Whitcomb, East Aurora, N. Y., assignors to General Motors Corporation, Detroit, Mich., a corporation of Delaware Application March 1, 1956, Serial No. 568,734

5 Claims. (Cl. 180—79.2)

This invention concerns automotive vehicles and more especially relates to improvements in the steering and handling characteristics of such vehicles, particularly when equipped with power steering apparatus.

It is generally recognized among automotive engineers that the operator of an automotive vehicle steers by "feel," derived in part through his hands at the steering wheel and in part through "the seat of his pants," the latter expression, of course, referring to the effect on the operator of changes in acceleration and direction.

Driving skill is perhaps best measured in terms of the speed with which the individual reacts and responds to changing conditions affecting vehicle attitude with reference to the desired path. Using this test, it is manifest on the basis of empirical observation alone, that the variation in driving skill among drivers as a whole, or for that matter among drivers in any selected group, excepting possibly experienced test and racing drivers, is very substantial indeed. Clearly, if some means could be found which would operate, in effect, to quicken the receptivity and responsiveness of the driver, whatever his inherent skill, the result would be highly beneficial.

The present invention aims to provide such means by feeding to the driver at the steering wheel force reactions not hitherto sensed in motor vehicle operation.

A further object is to provide steering control means which tend to keep the vehicle on a straight course, i. e. to reduce lateral acceleration and yawing velocity to zero.

Another and more specific object of the invention is to provide a system of apparatus for application to a power steered vehicle, which apparatus in operation modulates the action of the power steering control means to achieve the results sought.

There are two conditions of motor vehicle operation which particularly illustrate the need for this invention. The first is the incipient skid condition where the rear wheels of the vehicle are tending to break away, and the second is that obtaining when the vehicle encounters a strong, sudden, transverse wind gust. In the former case, the road force variations normally sensed at the steering wheel as "feel" tend to disappear or reverse leaving the driver with no front wheel position information, and in the latter case the road load on the front wheels develops too late for the driver to make the necessary steering correction. The present invention answers fully to both of these conditions. Thus, in either case it immediately indicates to the driver through the steering wheel the direction the dirigible wheels should be turned, to permit the speediest possible recovery.

The free-control (hands-off) stability of the vehicle is markedly improved by the present invention. Indeed, in certain emergency situations, as a skid on ice, it is not infrequently best that the steering wheel be released entirely so that the vehicle will be permitted to straighten up automatically.

The modulation of the power steering control means to attain the desired effects may be accomplished by a variety of means. Most suitably, however, the means employed are electric, hydraulic, or pneumatic in nature. The choice of instrumentation is to a large extent dictated by practical considerations including the type of power steering involved, although this is not to say that pneumatic mechanisms could not be used with an electric power steering gear, for example, or that hydraulic mechanisms could not be employed in conjunction with a pneumatic or mechanical power steering system.

We have elected to describe our invention in terms of a vehicle equipped for hydraulic power steering, this being the type of power steering most favored for commercial use, and with electrical instruments for accomplishing the objects above noted. In the accompanying drawing (Fig. 1), the embodiment of the invention shown is represented in somewhat diagrammatic fashion since the components employed may be of conventional design, well known to those skilled in the art. It is believed that the invention can best be made clear through this type of presentation.

Figure 1 is a diagrammatic representation of the steering and control mechanism comprising applicants' invention.

Figure 2:
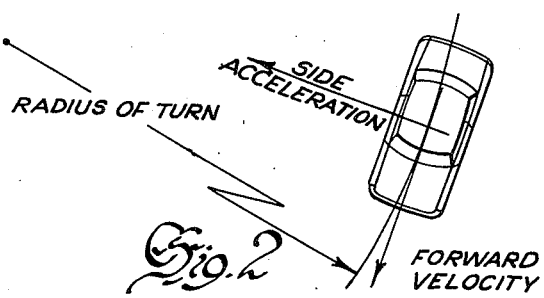

Fig. 2 of the drawings is a diagrammatic plan of a vehicle negotiating a right turn.

In the operation of the system shown, the driver-applied torques for actuating the dirigible vehicle wheels 62 are transmitted from the manual steering wheel 12 through the steering shaft 120 and ball nut 56 to pitman arm 60 and thence through the drag link 64 and steering knuckle arms 66 to the dirigible wheels.

A hydraulic system for providing a steering assist to the driver comprises, in general, a servo valve 122 adapted to control the supply and exhaust of fluid pressure to a servomotor 72 including a piston 70, the shaft 68 of which is operably connected to pitman arm 60. The necessary fluid is provided by a pump 10 drawing from a reservoir 13 and discharging through a filter 14 to an accumulator 16, directly meeting the demands of the servo valve 122.

To control the actuation of the servo valve 122 in accordance with the driver applied torques and motions of the vehicle induced by extraneous torques, as later explained, there is provided an electrical system including, in general, a torque sensing element 126, motion-sensing elements 128 and 130, a servo-amplifier 132, and a suitable power supply 124.

Considering the electrical apparatus now in greater detail, the power supply 124 is adapted to develop both alternating current power and direct current power for the system from the usual primary voltage source or battery 134 of an automotive vehicle. The alternating current power is preferably developed by an inverter 138 connected to the battery through a suitable power control box 136. The inverter may be of any suitable type for converting direct current to alternating current and preferably takes the form of a dynamoelectric inverter. A transformer 140 takes the output of the inverter 138 to develop the desired amplitude of alternating voltage.

The required value of direct current voltage is suitably developed from the battery 134 by a dynamotor 142 connected through the power control box 136. The output of the dynamotor is maintained at a substantially constant value of the desired magnitude by any suitable voltage regulator 144.

For clarity, the interconnection of the electrical components of the system is represented in single line fashion rather than by illustration of the complete circuits. Thus, the alternating voltage output of the power supply 124 is shown supplied by way of line 146 and the direct voltage output is shown supplied by way of line 148.

The torque-sensing element 126 for detecting the direction and magnitude of driver-applied torques is interposed in the steering train preferably on the steering shaft 120. This element may, with advantage, take the form of a resistance type strain gauge and is so mounted as to suitably respond, by resistance variation, to strains developed in the shaft on the turning thereof. The strain gauge is comprised of a bridge network excited or energized with alternating current from line 146 across one pair of bridge terminals. A control or torque signal voltage developed by the strain gauge is derived across the other pair of bridge terminals and is applied through conductor 150 to the servo-amplifier 132. The amplitude of output voltage of the strain gauge is proportional to the magnitude of the driver-applied torque, and the time phase or polarity of the output voltage is determined by the direction of the driver applied torque.

The motion-sensing elements 128 and 130 are responsive to selected components of vehicle motion and are adapted to develop control signal voltages corresponding to the character and degree or magnitude of the selected motions. In the case of the particular embodiment of the invention illustrated, the components of vehicle motion utilized are time functions of the angular and linear displacement of the vehicle. More particularly, these functions are the rate of turn, or yaw rate, which is the first time derivative of angular displacement and lateral acceleration which is the second time derivative of lateral displacement. Thus, the motion-sensing element 128 takes the form of a rate gyroscope adapted to develop a signal voltage proportional to the rate of turn of the vehicle about a vertical axis. The rate gyroscope may be of any conventional design having dynamic response characteristics matched to those of the vehicle and may have a single degree of freedom. Preferably, the instrument is mounted near the center of gravity of the vehicle. It is energized with an alternating voltage from line 146 and is provided with a suitable transducer element for developing an alternating output signal or control voltage which is proportional in amplitude to the rate of turn and of a time phase or polarity corresponding to the sense or direction of the rate of turn. This output signal voltage is applied by conductor 152 to the servo-amplifier 132.

The motion-sensing element 130, which is adapted to develop an output voltage indicative of the lateral acceleration of the vehicle, may be a conventional linear accelerometer. The device is energized with the alternating voltage from line 146 and includes the usual transducer element which develops an output signal or control voltage proportional in amplitude to the lateral acceleration of the vehicle and of a time phase or polarity corresponding to the sense of the acceleration. This output signal voltage is applied through conductor 154 to the servo-amplifier 132.

The servo-amplifier 132 is adapted to combine the control signals derived from the torque and motion-sensing devices in an algebraic manner and to amplify the resultant voltage for utilization in actuating the servo valve 122. Like other parts of the system, the servo-amplifier may be of conventional design and is supplied with direct voltage from the supply line 148 and alternating voltage from the line 146. It is provided with suitable control devices 156 for adjustment of the proportions of the various input signal voltages and of the over-all gain it provides. Included in the servo-amplifier is a phase sensitive demodulator preferably of the full wave type adapted to deliver a rectified output voltage which corresponds in amplitude and polarity to the algebraic sum of the input signal voltages. The output voltage of the servo-amplifier is utilized for energizing the control winding 160 of the servo valve 122.

The servo valve 122 is adapted to control the energization of the hydraulic servomotor 72 in accordance with the amplitude and polarity of the servo-amplifier output voltage. Such valve will be seen as having a transverse passage 162 connected with the accumulator 16 and a transverse passage 164 connected with the reservoir 13. It further includes a pair of plungers 166 and 168 adapted for axial movement to provide controlled hydraulic pressures in the conduits 170 and 172 which are connected with the upper and lower chambers, respectively, of the cylinder of the servomotor 72. Valve 122 is controlled by a permanently magnetized core 174 and a pivotal armature 176 having an energizing winding 160 disposed thereon. The armature 176 extends between a pair of spaced nozzles or orifices 178 and 180, which are supplied with pressure fluid from the accumulator by way of passages 182 and 184, respectively. Continuous flow through the orifices is permitted by a check valve passage 186 to the reservoir. Armature 176 is normally centered between the orifices 178 and 180 in the absence of a control current in the winding 160. This winding is energized in accordance wtih the output voltage of the servo-amplifier and magnetizes the armature with a polarity dependent upon the polarity of the energizing voltage. Pivotal motion is imparted to the armature in a direction dependent upon the polarity of magnetization. The position of the armature with respect to the orifices 178 and 180 is thus controlled with the effect of varying the discharge from the orifices in accordance with the proximity of the armature. Accordingly, the back pressure in the passages 177 and 179 is modulated causing the valve elements 166 and 168 to be displaced with respect to the supply pressure passage 162 and reservoir passage 164. In this manner, controlled pressures are delivered selectively to the conduits 170 and 172 and thence to the cylinder of the servo motor 72.

The operation of the apparatus will be described with reference to certain illustrative maneuvers of the vehicle: In order to execute a right turn, as illustrated in Figure 2, the driver turns the steering wheel 12 to the right transmitting the driver-applied torque to the dirigible wheels 62. The magnitude and direction of the torque is sensed by the strain gauge 126 and a corresponding control signal voltage is applied to the servo-amplifier 132. The change of heading of the vehicle occasioned by the manual control occurs at a given rate of turn, or yaw rate, about a vertical axis of the vehicle. This rate of turn is sensed by the rate gyroscope 128 which develops a control signal voltage indicative of the magnitude and direction thereof which is applied to the input of the servo-amplifier 132. This maneuver is also attended with a lateral acceleration of the vehicle having a direction radially inwardly and a magnitude dependent upon the radius of curvature of the turn and the velocity of the vehicle. The linear accelerometer senses this component of motion and develops a control signal voltage, indicative of the magnitude and direction, which is applied to the input of the servo-amplifier 132.

Before undertaking to explain the manner in which the input signals to the servo-amplifier are combined to obtain the desired effects, it will be helpful to consider first the behavior of the system with the control signal voltage indicative of driver-applied torque acting alone. This condition could, of course, be obtained simply by disconnecting the conductors 152 and 154 from the servo-amplifier 132. In operation under this condition, the output voltage of the strain gauge 126 is amplified by the servo-amplifier 132 and applied to the energizing coil 160. Assuming a right turn, the phase of the control signal applied to the amplifier will be such that the rectified amplifier output voltage will energize the coil 160 to cause counterclockwise displacement of the armature 176. This will impede the discharge from the orifice 180 and the increased back pressure in the passage 179 will cause the valve element 168 to move downward uncovering the transverse pressure supply passage 162 and closing the transverse reservoir passage 164. Controlled pressure is thus delivered from the passage 162 to the passage 172 and thence to the lower chamber of the servomotor 72. At the same time, the discharge from the orifice 178 is increased and the back pressure in the passage 177 is decreased, permitting the valve element 166 to move upwardly and uncovering the transverse exhaust passage 164. This permits the fluid in the upper chamber of the servo-motor to be discharged through conduit 170 to the reservoir. On the energization of the servomotor 72 the piston is displaced upwardly, causing the dirigible wheels 62 to be actuated through the steering linkage to execute a right turn. The turning effort exerted by the servomotor is in direct proportion to the turning effort exerted by the operator through the steering wheel 12. It will be apparent that in the execution of a left turn under the same conditions, a phase of the signal voltage from the strain gauge 126 will be reversed and the actuating coil 160 will be energized with reverse polarity. As a result, the actuation of valve 122 will be in the opposite sense and the turning effort exerted by the servomotor 72 will be in the direction to execute a left turn.

With regard now to the rate gyroscope 128, the purpose of the modulation derived from this instrument is to provide the vehicle operator with an artificial "feel" through the steering wheel and to further provide for free control or "hands-off" stability of the vehicle. The rate of turn signal voltage from the gyro is applied to the servo-amplifier in a phase sense such that its effect is to tend to cause the servomotor 72 to exert turning effort on the dirigible vehicle wheels in a direction opposite the direction of turn of the vehicle. In other words, the rate of turn signal voltage reduces the resultant servo-amplifier input signal and, consequently, the effort or assist afforded by the servomotor 72 is reduced. This effect is most pronounced when negotiating a curve at high speed or in executing a sharp turn at a lower speed. In such maneuvers, the rate of turn of the vehicle is relatively high, producing a rate of turn signal of relatively large amplitude, with the consequence of requiring the driver to exert a greater proportion of the turning effort for the dirigible wheels. At very low speeds in the execution of turning maneuvers, such as parking the vehicle, the rate of turn is of very small magnitude and the torque signal voltage is decreased only slightly or a negligible amount and the driver is afforded substantially the full benefit of the servomotor in turning the dirigible wheels.

The rate of turn signal contributes in a large measure to vehicle stability under conditions of free control or "hands off" operation. Assume, for example, that the vehicle encounters an icy road condition and commences to spin about its vertical axis. The rate of turn may be of great magnitude and the signal indicative thereof will be applied through the servo-amplifier 132 to the valve 122 with the proper phase sense tending to turn the dirigible wheels is the proper direction to terminate the vehicle spin, i. e., in the direction opposite the turning motion of the vehicle. This beneficial effect is realized regardless of the driver's effort toward corrective action. If the driver should err and attempt to turn the dirigible wheels in the direction of spin, the torque signal voltage developed thereby would be opposed and overcome by the rate of turn signal voltage whereby the proper corrective action would be achieved through the servomotor 72. If the driver reacts correctly to regain control, the torque signal voltage developed by his effort will be aided by the rate of turn signal voltage and the appropriate corrective action will follow.

The signal derived from the lateral accelerometer 130 is further effective to enhance the artificial feel and free control stability of the vehicle. The signal voltage derived from the accelerometer is applied to the servo amplifier in a phase sense which tends to cause the servomotor 72 to exert turning effort on the dirigible wheels in a direction or sense opposite the direction of lateral acceleration of the vehicle. In a turn, the vehicle is manifestly subject to lateral acceleration forces directed radially inwardly toward the center of curvature of the vehicle course. Therefore, in a right turn, the accelerometer signal voltage has a phase sense to produce turning of the dirigible wheels to the left and thus is in phase opposition to the torque signal voltage derived through the strain gauge 126 from driver applied torque. As a result, artificial feel is afforded the driver since the acceleration signal voltage reduces the effective resultant input voltage to the servo amplifier and he is required to exert a greater proportion of the total turning effort. This effect is also most pronounced at high vehicle speeds and during sharp turns and is practically negligible during parking maneuvers and other slow speed operations. The control exerted by the accelerometer is most beneficial in stabilizing present day vehicles against lateral disturbances as represented, for example, by strong side winds. The corrective action of the device is substantially instantaneous and it effectively prevents deviation of course throughout the duration of the disturbing force.

While only two different components of vehicle motion have been here shown for developing feel and stability control, it will be apparent that other components of motion and/or any desired time functions thereof may be utilized to provide the degree of refinement desired in the performance of the system. The proportions in which the various control signals are combined is largely a matter of choice depending upon the response characteristics sought.

We claim:

1. In an automotive vehicle, manual steering apparatus operatively connected with a steering part for controlling the course of the vehicle over a roadway, power steering apparatus including a servomotor operatively connected with said steering part, control means for energizing the servomotor, first sensing means connected with said manual steering apparatus for developing a control signal indicative of the sense and magnitude of the manually applied steering effort, second sensing means on the vehicle and being responsive to a selected course-changing motion of said vehicle for developing a control signal indicative of the sense and magnitude of the selected course-changing motion, means for algebraically combining the control signals in predetermined proportions for deriving a resultant control signal, and means for applying said resultant control signal to said control means whereby the energization of the servomotor is dependent upon a combined function of manual effort and the course-changing motion of the vehicle.

2. In an automotive vehicle, manual steering apparatus including a steering shaft operatively connected with a steering part, power steering apparatus including a reversible servomotor operatively connected with said steering part, control means for regulating the energization of said servomotor, means responsive to manually applied torque in the steering shaft for developing a control signal indicative of the sense and magnitude of the manually applied torque, means responsive to a time function of the angular displacement of said vehicle about its vertical axis for developing a modulating signal indicative of the sense and magnitude thereof, means responsive to a time function of the linear displacement of said vehicle in a horizontal plane for developing a modulating signal indicative of the sense and magnitude thereof, means for algebraically combining the control signal and the modulating signals in predetermined proportions for deriving a modulated control signal, and means for applying said modulated control signal to said control means whereby the manually exerted effort required to impart directional control to the vehicle is dependent upon the sense and magnitude of the vehicle motions.

3. In an automotive vehicle, manual steering apparatus including a steering shaft operatively connected with a steering part, power steering apparatus including a servomotor operatively connected with said steering part, control means for energizing the servomotor, a strain gauge pick-off mounted on the steering shaft for developing a control signal indicative of the sense and magnitude of the manually applied torque, a rate gyroscope mounted on said vehicle for developing a control signal indicative of the sense and magnitude of the rate of turn of said vehicle, means for algebraically combining the control signals in predetermined proportions for deriving a resultant control signal and means for applying said resultant control signal to said control means.

4. In an automotive vehicle, manual steering apparatus including a steering shaft operatively connected with a steering part, power steering apparatus including a servomotor operatively connected with said steering part, control means for energizing the servomotor, a strain gauge pick-off on said steering shaft for developing a control signal indicative of the sense and magnitude of the manually applied torque, a lateral accelerometer mounted on the vehicle for developing a control signal indicative of the sense and magnitude of the lateral acceleration of the vehicle, means for algebraically combining the control signals in predetermined proportions for deriving a resultant control signal and means for applying said resultant control signal to said control means.

5. In an automotive vehicle, manual steering apparatus including a steering shaft operatively connected with a steering part, power steering apparatus including a servomotor operatively connected with said steering part, control means for regulating the energization of said servomotor, an electrical strain gauge pick-off on said steering shaft adapted to develop a control signal voltage of amplitude and phase corresponding to the magnitude and direction of manually applied turning effort, a rate gyroscope on the vehicle adapted to develop a modulating control signal voltage of amplitude and phase corresponding to the magnitude and direction of the rate of turn of the vehicle about its vertical axis, an accelerometer on the vehicle adapted to develop a control signal voltage of amplitude and phase corresponding to the magnitude and direction of the lateral acceleration of the vehicle, a servo-amplifier adapted to algebraically combine said control signals in selected proportions and to develop a resultant control signal voltage having a polarity and magnitude corresponding to the phase and amplitude of the algebraic sum of the control voltages, and means for applying the resultant control voltage to said control means for energizing the servomotor in accordance with the magnitude and polarity of the resultant control signal.

References Cited in the file of this patent

UNITED STATES PATENTS

| | | |
|---|---|---|
| 2,553,940 | Quartullo | May 22, 1951 |
| 2,754,465 | Brier | July 10, 1956 |